US010498771B1

(12) United States Patent
Irwan et al.

(10) Patent No.: US 10,498,771 B1
(45) Date of Patent: *Dec. 3, 2019

(54) PROTOCOL AGNOSTIC SECURITY BY USING OUT-OF-BAND HEALTH CHECK

(71) Applicant: Xage Security, Inc., Palo Alto, CA (US)

(72) Inventors: Susanto Junaidi Irwan, San Francisco, CA (US); Roman M. Arutyunov, San Jose, CA (US); Andy Sugiarto, Moraga, CA (US); Ganesh B. Jampani, Gilroy, CA (US)

(73) Assignee: Xage Security, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/136,807

(22) Filed: Sep. 20, 2018

Related U.S. Application Data

(63) Continuation of application No. 15/979,402, filed on May 14, 2018, now Pat. No. 10,084,826.

(51) Int. Cl.
*H04L 29/06* (2006.01)
*H04L 9/06* (2006.01)
(Continued)

(52) U.S. Cl.
CPC ............ *H04L 63/20* (2013.01); *G06F 21/577* (2013.01); *H04L 9/0637* (2013.01); *H04L 63/10* (2013.01);
(Continued)

(58) Field of Classification Search
CPC ....... H04L 63/20; H04L 9/0637; H04L 63/10; H04L 63/18; H04L 67/10; H04L 2209/38; G06F 21/577; G06F 2221/034
See application file for complete search history.

(56) References Cited

U.S. PATENT DOCUMENTS 10,020,936 B1 * 7/2018 Ghetti ..................... H04L 9/083
2012/0266209 A1 * 10/2012 Gooding ................. H04L 63/20
726/1

(Continued)

OTHER PUBLICATIONS

Irwan, U.S. Appl. No. 15/979,402, filed May 14, 2018, Notice of Allowance, dated Jul. 24, 2018.

*Primary Examiner* — Techane Gergiso
(74) *Attorney, Agent, or Firm* — Hickman Palermo Becker Bingham LLP

(57) ABSTRACT

A computer-implemented method provides an improvement in security breach detection and comprises calculating a digital fingerprint based on security service data of a computing device, and sending the fingerprint out-of-band for storing in a data repository; generating encrypted current security service data from the computing device and sending the encrypted current security service data out-of-band to a gateway computing device; using the gateway computing device, receiving the encrypted current security service data out-of-band and conducting a real-time out-of-band health check of the computing device based, at least in part, on the fingerprint that is stored in the data repository; and using the gateway computing device, in response to conducting the real-time out-of-band health check, determining whether to allow access to in-band communication data.

25 Claims, 7 Drawing Sheets

(51) Int. Cl.
    *G06F 21/57*        (2013.01)
    *H04L 29/08*       (2006.01)

(52) U.S. Cl.
    CPC ........ *H04L 63/18* (2013.01); *G06F 2221/034* (2013.01); *H04L 67/10* (2013.01); *H04L 2209/38* (2013.01)

(56) References Cited

U.S. PATENT DOCUMENTS

| | | | | |
|---|---|---|---|---|
| 2015/0188949 | A1* | 7/2015 | Mahaffey | H04L 63/20 726/1 |
| 2016/0366183 | A1* | 12/2016 | Smith | H04L 63/06 |

\* cited by examiner

PROTOCOL AGNOSTIC SECURITY BY USING OUT-OF-BAND HEALTH CHECK

BENEFIT CLAIM

This application claims the benefit under 35 U.S.C. § 120 as a Continuation of application Ser. No. 15/979,402, filed May 14, 2018, the entire contents of which is hereby incorporated by reference for all purposes as if fully set forth herein.

TECHNICAL FIELD

One technical field of the present disclosure relates to improved methods, systems, computer software, and/or computer hardware in the field of data security. The disclosure relates more specifically to improved computer-implemented methods and systems for providing continuous, out-of-band security checks that function in real time using a distributed architecture and distributed database. Certain embodiments are useful in providing device integrity health check services for industrial devices or Internet of Things (IoT) devices and improving the resistance of networked industrial devices and IoT devices to attacks, unauthorized or malicious use, or malware.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The development and deployment of internet of things (IoT) devices has proceeded with remarkable speed in the past several years. IoT devices are diverse, including everything from controllers of industrial equipment to smart watches and personal activity monitors. However, security infrastructure has not kept pace with the huge number and wide use of these devices. Some analysts estimate that billions of such devices will be operating and connected to internetworks within a few years, but there is presently no effective security architecture that can efficiently permit IoT devices to be secured, yet readily usable. Key constraints in this technical field have included limited processing power, limited memory, limited or absent user interface elements, and limited and intermittent network connectivity. All these characteristics of IoT devices make them difficult to integrate into existing security systems. At the same time, misuse of IoT devices could be catastrophic by permitting an attacker or unauthorized user to gain control of industrial equipment or other systems that have embedded IoT devices.

Industrial and commercial operators are currently deploying millions of IoT devices in various enterprise environments. These IoT device often use different data communication protocols to communicate. In previous approaches, security measures have been data protocol-dependent, making these security techniques difficult to universally apply to devices that communicate using different protocols. Moreover, previous security techniques often required prior knowledge of malware signatures and attack patterns, which limited the effectiveness of such security techniques in preventing previously unknown attacks.

Thus, there is a need for decreasing the network and computing processing burden of implementing various data protocol-dependent security measures by using a data protocol-agnostic device health check system. There is also a need for better security breach detection and protection that is not dependent on known malware signatures and attack patterns. There is also a need for a secure method of storing and accessing device information that is tolerant of security breaches.

SUMMARY

The appended claims may serve as a summary of the invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
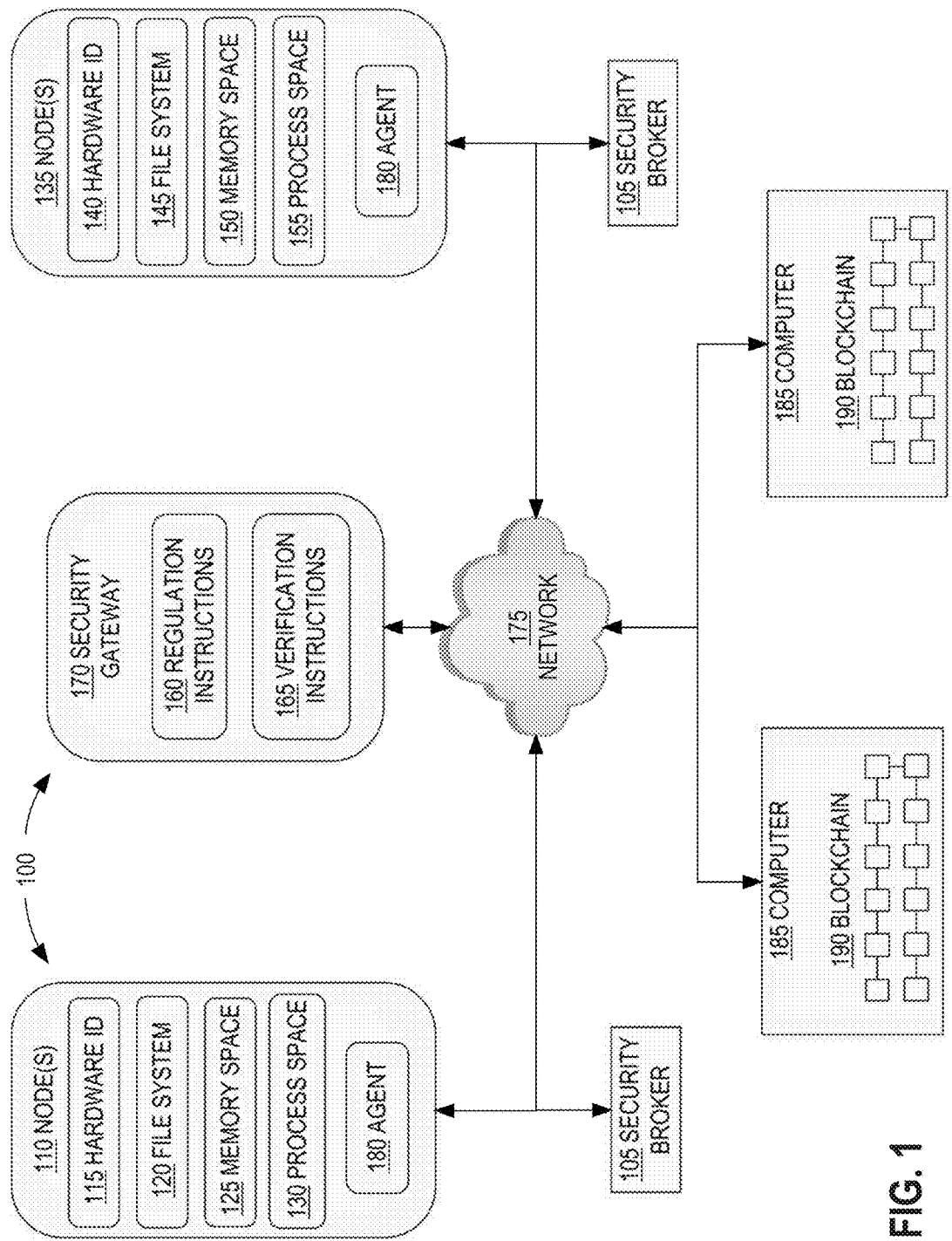
FIG. 1 illustrates a networked computer system, in an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

1.0 GENERAL OVERVIEW
    2.0 STRUCTURAL OVERVIEW
    3.0 FUNCTIONAL OVERVIEW
       3.1 SECURITY BROKER
       3.2 AGENT AND SECURITY GATEWAY
       3.3 BLOCKCHAIN OPERATIONS
    4.0 PROCEDURAL OVERVIEW
    5.0 HARDWARE OVERVIEW

1.0 General Overview

According to various embodiments, methods and systems are provided that enable improved computer processing efficiency and data security. In past approaches, regulating the secure exchange of data between devices or nodes often involved in-band, protocol-specific security measures. Not only were these measures limited to specific protocols, but the in-band implementation of these measure meant excessive use of network bandwidth. The current approach provides for an improved distributed system that uses a security broker to collect hardware, firmware, and software data, generate a fingerprint based on the data, and send the fingerprint out-of-band to a blockchain data repository for storage. The current approach also uses a security gateway to continuously conduct out-of-band validity checks using the fingerprint stored in the blockchain. The validity checks are used to regulate in-band communication between devices, such as IoT devices in an industrial network.

The distributed system utilizes a distributed blockchain database to store the data, thereby using a consensus network for increased data security. This approach has the benefit of decreasing excessive use of processing resources while increasing resistance against malicious attacks on sensitive data.

In an embodiment, a computer-implemented method provides improvements in security breach detection and mitigation. The method comprises using a broker computing device, calculating a digital fingerprint of a computing device based on security service data of the computing device, and sending the fingerprint out-of-band for storing in a data repository. The method further comprises using an agent computing device, encrypting current security service data of the computing device to generate encrypted current security service data and sending the encrypted current security service data out-of-band to a gateway computing device. The method further comprises using the gateway computing device, receiving the encrypted current security service data out-of-band and conducting a real-time out-of-band health check of the computing device based, at least in part, on the fingerprint that is stored in the data repository. The method further comprises using the gateway computing device, in response to conducting the real-time out-of-band health check, determining whether to allow access to in-band communication data.

2.0 Structural Overview

FIG. 1 illustrates a networked computer system in an example embodiment.

In an embodiment, a computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" may be one or more physical computers, virtual computers, and/or computing devices. As an example, a computer may be one or more server computers, cloud-based computers, cloud-based cluster of computers, docker containers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment.

FIG. 1 illustrates only one of many possible arrangements of components configured to execute the programming described herein. Other arrangements may include fewer or different components, and the division of work between the components may vary depending on the arrangement. In the example of FIG. 1, a networked computer system 100 may facilitate the secure exchange of data between programmed node computing devices 110, 135, agents 180 running on the or separately from the computing devices, security brokers 105, security gateways 170, and devices of a blockchain 190. Therefore, various elements of 105, 110, 135, 170, 180 and 190 of FIG. 1 may each represent one or more computers that host or execute stored programs that provide the functions and operations that are described further herein in connection with data verification and regulation services and blockchain operations.

The methods and systems describe herein may be data protocol-agnostic and designed to accommodate a variety of different devices that use different protocols for data communication. The methods and systems described herein may also increase security without relying on prior knowledge of malicious attack patterns or malware signatures. While each of the components listed in FIG. 1 is illustrated as if located on a single device, one or more of the components listed above may be part of and/or executed on different computers. For example, while the agent 180 is depicted as running on node 110, 135, the agent 180 may, in some embodiments, run on a separate device that is associated with and coupled to node 110, 135.

Node(s) 110, 135 computer, software, firmware, hardware, or any combination thereof. In an embodiment, node 110, 135 may be a computer, a virtual computer, and/or a computing device. As an example, a computer may be one or more server computers, cloud-based computers, cloud-based cluster of computers, docker containers, virtual machine instances or virtual machine computing elements such as virtual processors, storage and memory, data centers, storage devices, desktop computers, laptop computers, mobile devices, and/or any other special-purpose computing devices.

Node 110, 135 may also be IoT devices, which are physical devices with network connectivity capabilities that enables these physical devices to collect and exchange data. In an embodiment, the IoT devices may be industrial IoT meters, sensors, controllers, cameras, or any other industrial IoT device. In an embodiment, node 110, 135 may be one or more of a variety of networked computing devices in an industrial control system, such as a Supervisory Control And Data Acquisition (SCADA) system that uses a series of computers, programmable logic controllers, Proportional Integral Derivative (PID) controllers, and other networked devices for process control in an industrial environment. While SCADA is used as an example, any other process control system, such as the Distributed Control System (DCS) may also be used. Node 110, 135 may also be a software application or any other stored computing instructions running on a computing device.

Each node 110, 135 may have data related to hardware identifier 115, 140, a file system 120, 145, memory space 125, 150, process space 130, 155, or any other features of the node 110, 135. The data is subsequently used to generate unique fingerprints for the implementation of integrity health checks in an improved security system.

A security broker 105 may be a computer, software and/or hardware or a combination storing instructions that are programmed or configured to access security service data related to node 110, 135 and securely transfer the security service data. In an embodiment, the security broker 105 may generate hashes and encrypt the security service data and send the information over a network 175 to a digital blockchain 190 data repository for storage, as further described herein.

An agent 180 may be a computer, software and/or hardware or a combination storing instructions that are programmed or configured to continuously monitor nodes 110, 135 for security service data changes. An agent 180 may also be programmed or configured to receive requests for security service data from a security gateway 170 and encrypt and send the security service data using an out-of-band medium. In an embodiment, the agent 180 may be software that runs on a node 110, 135 while in other embodiments, the agent 180 may be a separate computing device.

Network 175 broadly represents a combination of one or more wireless or wired networks, such as local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 175 and the disclosure presumes that all elements of FIG. 1 are communicatively coupled via network 175. The various elements depicted in FIG. 1 may also communicate with each other via direct communications links that are not depicted in FIG. 1 for purposes of explanation.

The blockchain 190 may comprise blocks of linked data that are stored in an interconnected network of computers, with suitable stored programs at those computers to support ordered creation and transmission of blockchain data. Blockchain 190 forms a distributed database that maintains a continuously growing list of ordered records termed blocks that are timestamped and linked to a previous block. Each block in the series of blocks is linked together chronologically, with each new block containing a hash of the previous block. Each computer 185, or node, in a network of computers may store the entire record of linked data blocks. This creates a consensus network of computers that can verify the integrity of each block of data and the integrity of the entire blockchain 190. The consensus network has the benefit of having a high Byzantine fault tolerance, which is the ability of a computing system to tolerate Byzantine failures. As a result, the blockchain 190 functions as a distributed database that ensures the integrity of the data by utilizing hash functions to link each block to its previous block and storing the entire record of data blocks at each node.

A security gateway 170 may be a computer, software and/or hardware or a combination storing instructions configured to access security service data stored in the blockchain 190, receive current security service data from an agent 180 medium, perform out-of-band device integrity health checks, and regulate in-band data communication based on the out-of-band device integrity health checks.

3.0 Functional Overview

In an embodiment, the security broker 105, agent 180, blockchain 190, and security gateway 170 interoperate programmatically in an unconventional manner to provide a virtual security intermediary that continuously validates the integrity of devices out-of-band. In an embodiment, security gateway 170 is programmed to verify the integrity of various devices using the data stored in the blockchain 190. The security broker 105, agent 180, and blockchain 190 are programmed or configured to copy, encrypt, distribute, store, transport, and monitor sensitive security information in a secure manner so that the security gateway 170 may perform these checks using the data, as further described in other sections herein.

3.1 Security Broker

Figure 2:
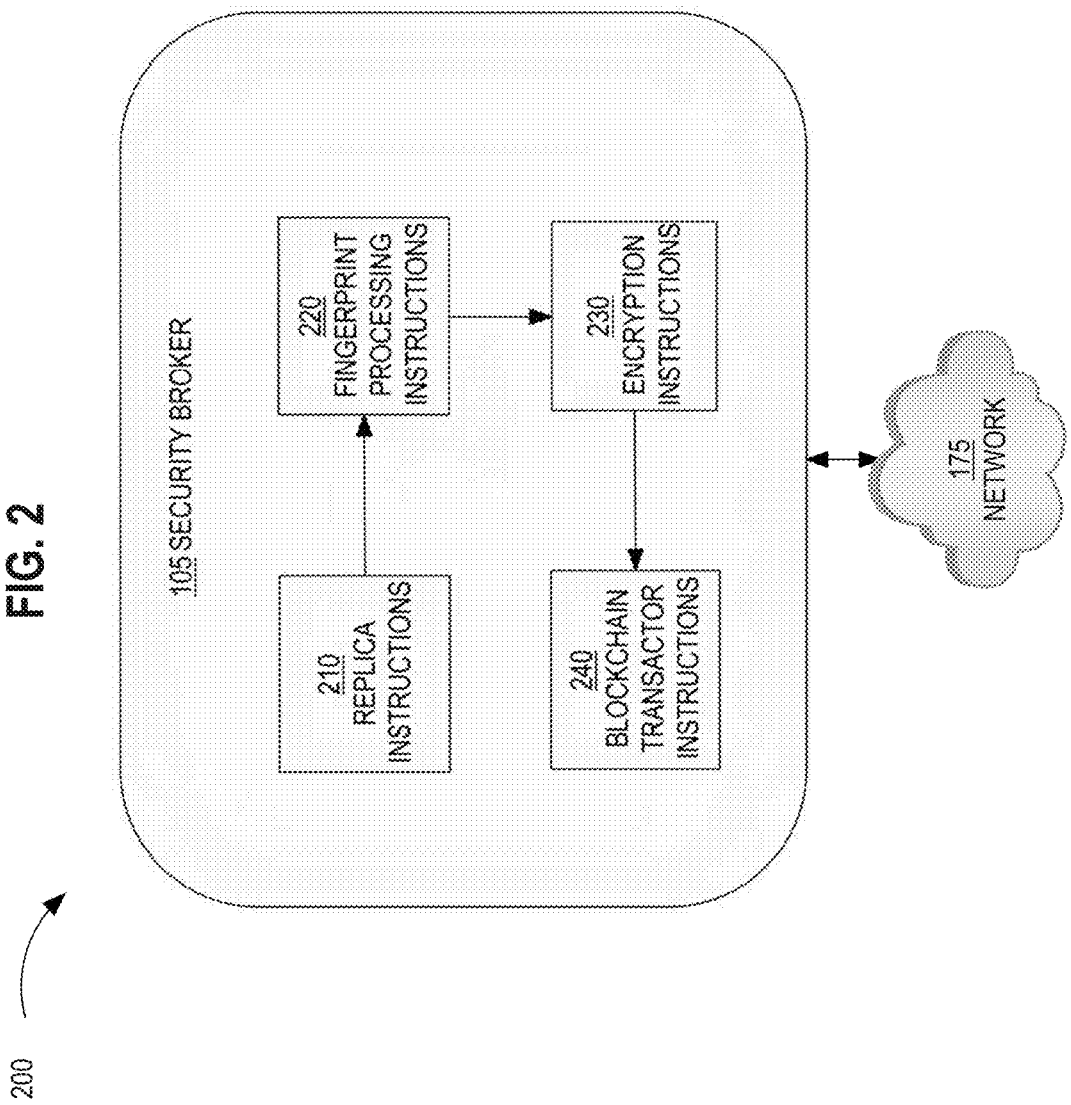
FIG. 2 illustrates a security broker, in an example embodiment.

FIG. 2 illustrates a security broker, in an example embodiment.

In an embodiment, reference numeral 200 indicates a computer system comprising a security broker 105 coupled to a data network 175. Specifically, security broker 105 may store and execute replica instructions 210 which generates a digital replica of each node system, including data related to hardware identifiers 115, 140, file systems 120, 145, memory space 125, 150, process space 130, 155, or any other features of the node 110, 135. In an embodiment, the digital replica may be stored locally in a data repository associated with the security broker 105.

The security broker 105 may also store and execute fingerprint processing instructions 220, which generates a fingerprint based on security service data from the digital replica of each node system. In this context, a fingerprint is a set of digital data forming a unique digital identifier for the node 110, 135. The fingerprint may comprise multiple object identifiers for security service data, such as hardware data, firmware data, software data, memory space usage, or any other data from the node 110, 135. In an embodiment, the fingerprint processing instructions 220 may generate object identifiers for hardware-based security service data, such as object identifiers for a Central Processing Unit (CPU) identifier, a Media Access Control (MAC) address, a hard drive serial number, and/or a memory identifier. In another embodiment, the fingerprint processing instructions 220 may generate object identifiers for firmware-based security service data such as a firmware identifier and/or a firmware signature. In another embodiment, the fingerprint processing instructions 220 may generate object identifiers for software-based security service data, such as a static checksum of the files stored in the node 110, 135 and/or a dynamic checksum of one or more processes in memory. In another embodiment, the fingerprint processing instructions 220 may generate object identifiers for memory space. Specifically, weighted calculations may be used to evaluate memory space and determine the amount of memory that is reasonably or commonly used by specific programs running on the node 110, 135. Any unreasonable or uncommon memory usage may be designated as an anomaly. Any of the above one or more object identifiers may be used in generating a fingerprint.

In an embodiment, the security broker 105 may also store and execute instructions for dynamically specifying which object identifiers should be check by the security gateway 170 during the health check. For example, the security broker 105 may use security policies to specific which of the one or more object identifiers listed above may be used by the security gateway 170 during the health check.

In an embodiment, each object identifier may be encrypted by encryption instructions 230 to generate the fingerprint. For example, the encryption instructions 230 may apply a hash algorithm, such as an MD5, Secure Hash Algorithm (SHA) 256, or any other hash function, to each of the object identifiers to generate a plurality of hashed or encrypted data object identifiers. The hash may act as a numerical representation of the object identifiers. Any hash function, as understood in the art, may be used. Any changes to the object identifiers would change the hash, thereby creating differences in the current hash compared to a previous hash.

In an embodiment, the fingerprint is not a single hash of all the object identifiers, but rather multiple hashes of each object identifier to enable dynamic health checks of each of the encrypted data object identifiers individually. The fingerprint, containing each of the encrypted object identifiers, is then sent over network 175 to the digital blockchain 190 data repository for storage using the blockchain transactor instructions 240. The blockchain transactor instructions 240 update blockchain 190 by creating new data entries of the fingerprint in the blockchain 190.

In an embodiment, any authorized changes to the node 110, 135 may first be applied to the digital replica generated by the security broker 105, and an updated fingerprint calculated and sent to the blockchain 190 for storage. For example, the replica instructions 210 may enable a verified administrator to access the digital replica and apply changes and/or updates to the hardware, software, firmware, or any other features of the node 110, 135 system. The administrate may, for example, update a file in the file system 120, 145. The security broker 105 may then use fingerprint processing instructions 220 to generate new object identifiers for the altered data and subsequently use encryption instructions 230 to recalculate an updated fingerprint based on the changes. The security broker 105 may then use blockchain transactor instructions 240 to send the updated fingerprint over the network 175 to the blockchain 190 for storage. The blockchain transactor instructions 240 update blockchain 190 by creating new data entries of the updated fingerprints in the blockchain 190.

3.2 Agent and Security Gateway

Figure 3:
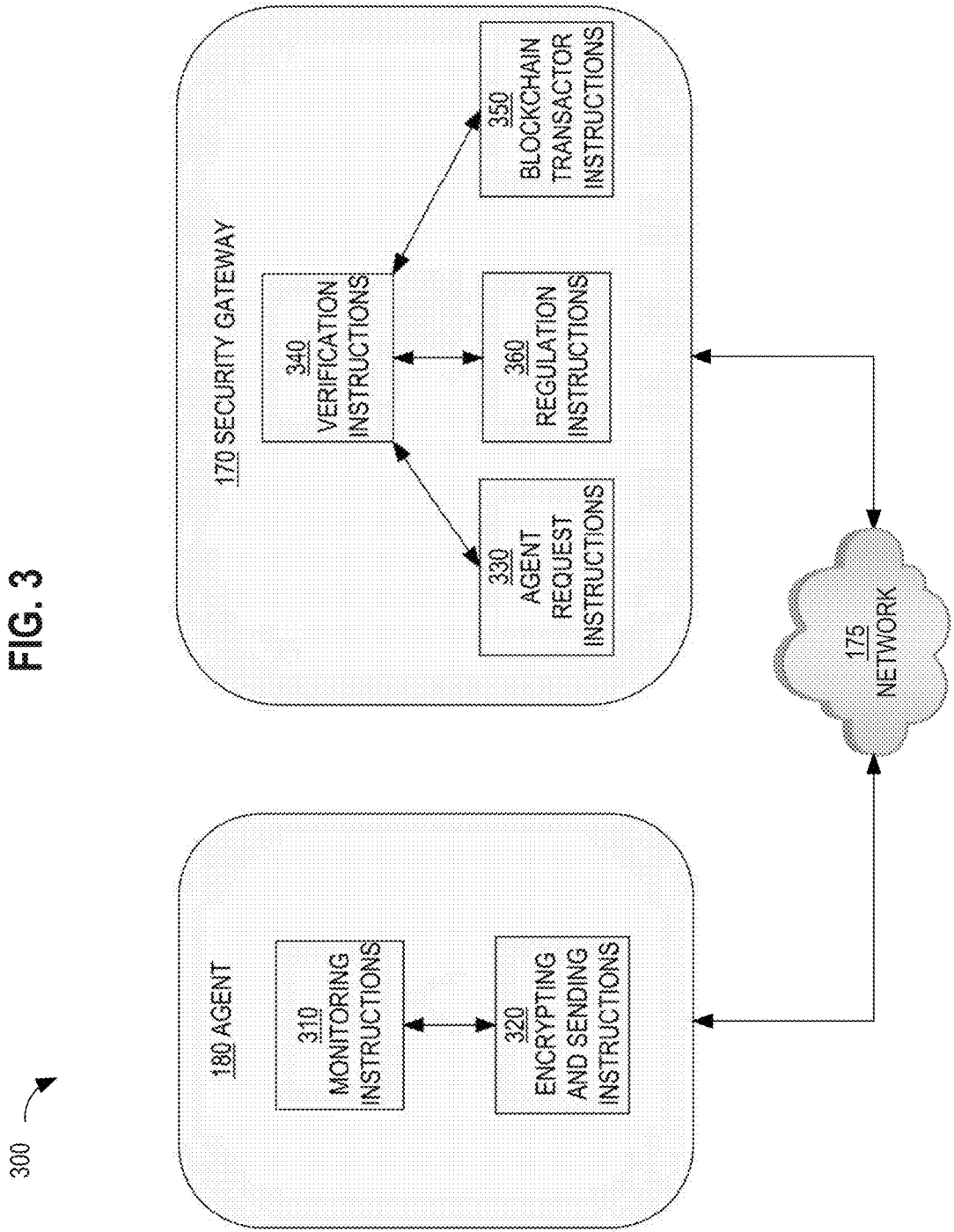
FIG. 3 illustrates an agent and a security gateway, in an example embodiment.

FIG. 3 illustrates an agent and a security gateway, in an example embodiment.

In an embodiment, reference numeral 300 indicates a computing system comprising a gateway 170 and an agent 180 coupled to a data network 175. Agent 180 may be a computer, software and/or hardware or a combination storing instructions and/or databases that act to protect, store, distribute, encrypt, monitor, and transfer security service data out-of-band. Each node 110, 135 may have an associated agent 180 running locally within their network in order to provide these out-of-band services. In an embodiment, an agent 180 may run on the same device as each node 110, 135. In another embodiment, an agent 180 may run on a separate device that is associated with one or more nodes 110, 135.

Security gateway 170 may be a computer, software and/or hardware or a combination storing instructions and/or databases that access and utilize security service data from the blockchain 190 for conducting device integrity health checks. Specifically, the security gateway 170 may connect to the blockchain 190 through the network 175 to access the security service data, as well as receive current security service data from agents 180 in real time to perform device integrity health checks. In response to performing out-of-band health checks, the security gateway 170 may then regulate in-band data communications based on the health checks.

Specifically, an agent 180 may use monitoring instructions 310 to continuously monitor each node 110, 135 and all associated security service data associated with the node 110, 135. Security gateway 170 may use regulation instructions 360 to monitor in-band data communications to and from various nodes. In an embodiment, when in-band data communications are detected, the security gateway 170 may use agent request instructions 330 to send an out-of-band request for a fingerprint to the agent 180 that is monitoring the node 110, 135. The request may be for specific object identifiers of a fingerprint or a combination of various object identifiers of a fingerprint.

In response, the agent 180 may use monitoring instructions 310 to obtain the one or more requested object identifiers of the fingerprint. The agent 180 may then use encrypting and sending instructions 320 to encrypt the object identifiers using the same hash algorithm that was previously used by the security broker 105 and then send the encrypted data object identifiers to the security gateway 170. In another embodiment, the agent 180 may encrypt and send the fingerprint information to the gateway 170 in regular intervals in advance of any gateway requests. The regular intervals may be in milliseconds, seconds, minutes, hours, or any other incremental time period.

The security gateway may then use verification instructions 340 to conduct a device integrity health check by comparing the current encrypted data received from the agent 180 to the encrypted data stored in the blockchain 190. In an embodiment, the verification instructions 340 may work in conjunction with the blockchain transactor instructions 350 to retrieve the fingerprint from the blockchain 190 for comparison purposes. The verification instructions 340 may compare the hash value received from the agent 180 with the hash value stored in the blockchain 190 and determine if there is a match. If the hashes match, the regulation instructions 360 may allow access to the in-band data communication. If the hashes do not match, then the regulation instructions 360 may deny access to the in-band data communication by blocking specific ports.

The entire health check verification process may be conducted out-of-band but in parallel to and in real time with the in-band data communication. This approach allows for protocol-agnostic health checks that do not depend upon the specific protocols that are used to exchange data in-band because the health checks occur out-of-band.

Figure 4:
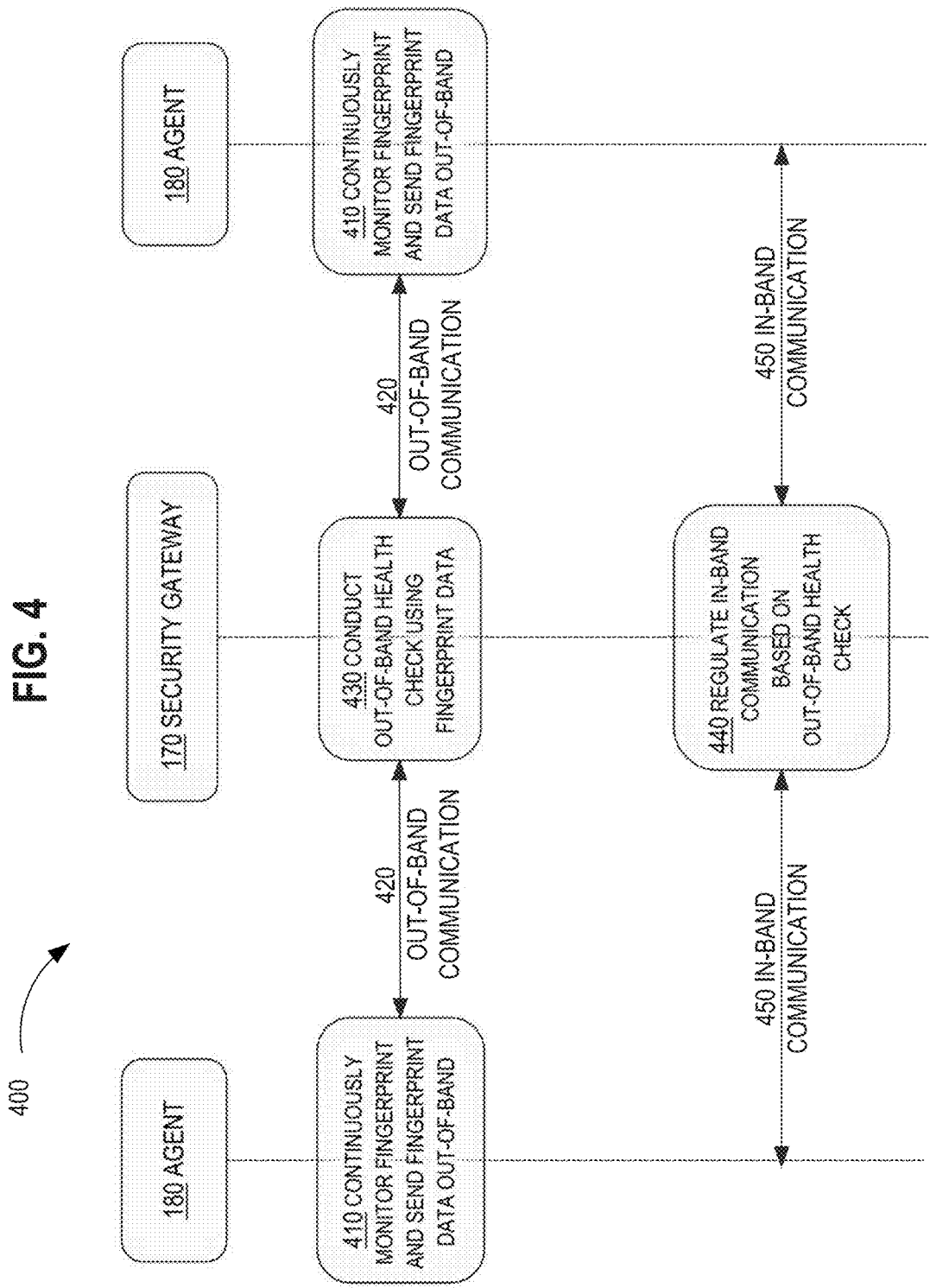
FIG. 4 illustrates a device message flow, in an example embodiment.

FIG. 4 illustrates a device message flow, in an example embodiment.

In an example message flow 400, one or more agents 180 may, at step 410, engage in continuous monitoring of fingerprint and fingerprint data. For example, an agent 180 associated with a node 110, 135 may continuously monitor the hardware identifier 115, 140, the file system 120, 145, the memory space 125, 150, the process space 130, 155, or any other features of the node system for hardware data, software data, firmware data, memory usage data, or any other data that is used to generate a fingerprint.

At step 410 the agent may also send fingerprint data to the security gateway 170 using out-of-band communication 420.

At step 430, the security gateway 170 use the fingerprint data received from the agent 180 and fingerprint data stored in the blockchain 190 to conduct out-of-band health checks.

At step 440, the security gateway 170 may regulate in-band communication based on the out-of-band health check. For example, if the health check concludes that the fingerprints do not match, then the in-band communication 450 may be denied. Specifically, the security gateway 170 may block specific ports to deny the in-band communication 450. If the health check concludes that the fingerprints match, then the in-band communication 450 may be allowed.

3.3 Blockchain Operations

In other applications, a blockchain functions as a decentralized digital ledger that tracks numerous entries. Copies of the entire blockchain may be stored at each computer 185, or node, in a distributed network of interconnected computers of which FIG. 1 illustrates computer 185 with blockchain 190.

In an embodiment, proposed entries to the blockchain 190 may be checked by a majority of the computers for verification. For example, if the blockchain transactor instructions 450 of the security broker 105 attempts to generate a new entry in the blockchain 190, the network of interconnected computers that also store copies of the blockchain would first run algorithms to evaluate the hashes and verify the validity of the entry. If a majority of the computers agree that the entry is valid, then the entry will be added as a new block in the blockchain 190. As a part of a consensus network, blockchain 190 enforces high Practical Byzantine Fault Tolerance (PBFT) and other types of consensus algorithms; for example, a malicious attack attempting to alter the information in the blockchain 190 would need to control over 50% of the computers in the consensus network to alter the consensus. Since it would be exceedingly difficult to maliciously attack and maintain control over that many computers, the blockchain data is better protected against malicious attacks than traditional methods of data storage.

Figure 5:
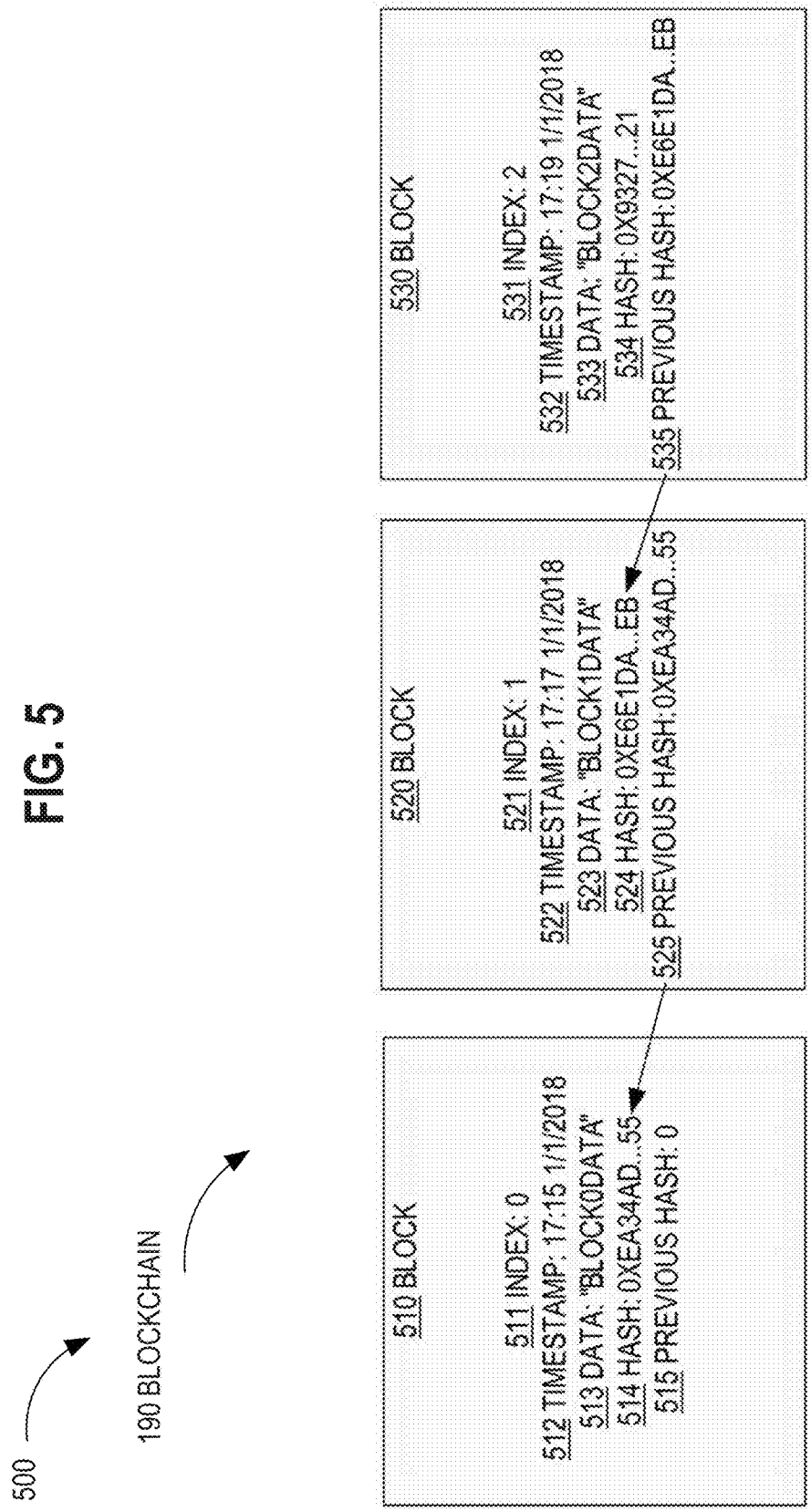
FIG. 5 illustrates a digital blockchain database, in an example embodiment.

FIG. 5 illustrates a digital blockchain database.

In an example embodiment, a digital blockchain database 500 comprises a blockchain 190 having blocks 510, 520, 530. Blockchain 190 may include any number of blocks. In the example of FIG. 5, each block 510, 520, 530 may include its own index number 511, 521, 531, timestamp 512, 522, 532, data 513, 523, 533, hash 514, 524, 534, and previous hash 515, 525, 535.

The index number 511, 521, 531 may be a numerical index that indicates the block's placement in the chain. The timestamp 512, 522, 532 may be the date and time of when a block 510, 520, 530 is created. The data 513, 523, 533 may be an encrypted share stored as "block0data" "block1data", and "block2data" in the blocks 510, 520, 530, respectively. The hash 514, 524, 534 may be a hash of the encrypted share, such as an MD5 hash, SHA256 hash, or RIPEMD hash. The previous hash 515, 525, 535 may be the hash of the previous block, which links the blocks in sequence. In the example of FIG. 5, block 530 stores a record of previous hash 524, while block 520 stores a record of previous hash 514. These records of previous hashes link each new block to the previous block to form a chain that allows for integrity checks of each block.

4.0 Procedural Overview

Figure 6:
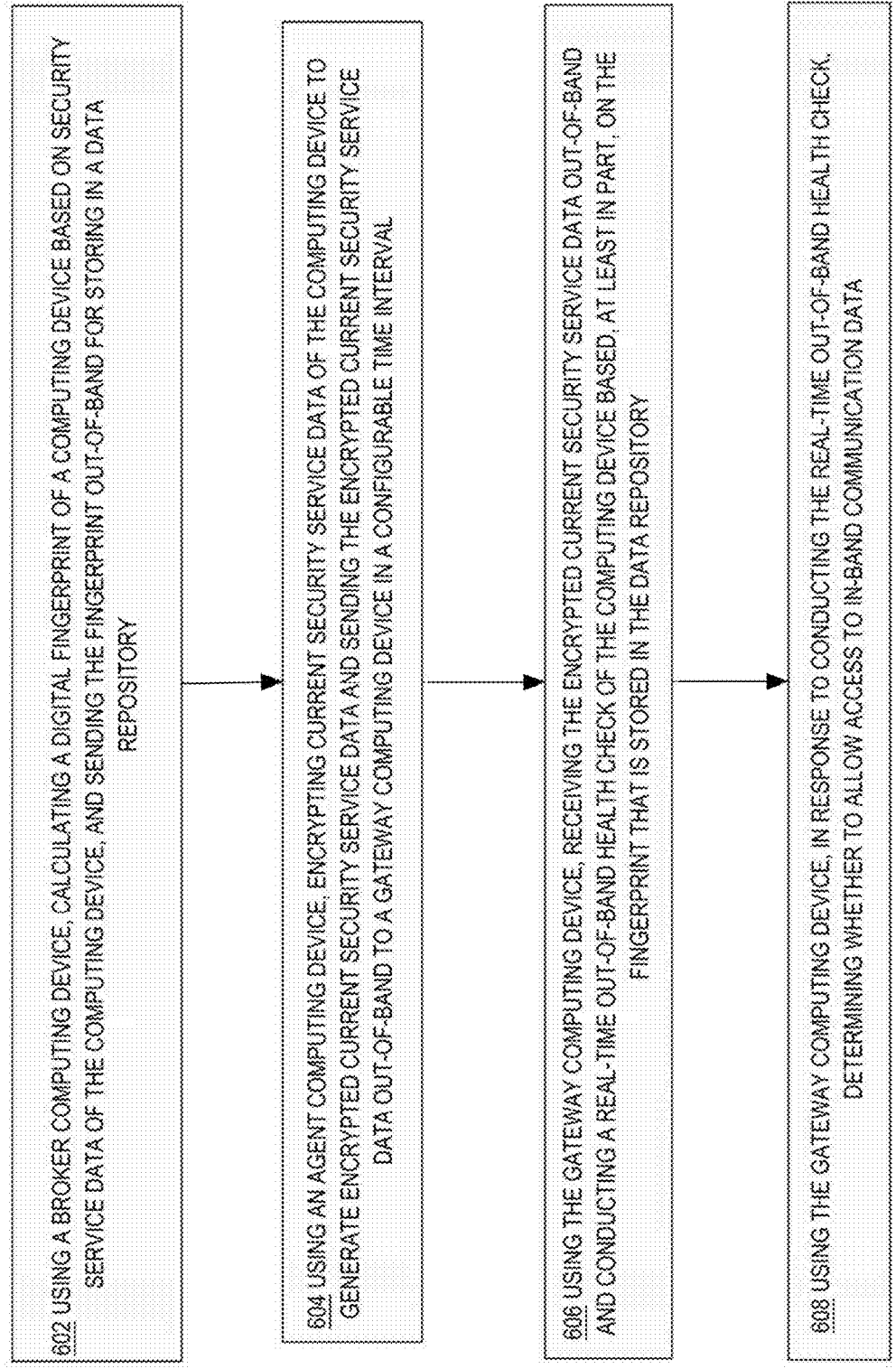
FIG. 6 illustrates an algorithm or method for conducting out-of-band health checks, in an example embodiment.

FIG. 6 illustrates an algorithm or method for conducting out-of-band health checks, in an example embodiment. For purposes of illustrating a clear example, FIG. 6 is described herein in the context of FIG. 1, but the broad principles of FIG. 6 can be applied to other systems having configurations other than as shown in FIG. 1. Further, FIG. 6 and each other flow diagram herein illustrates an algorithm or plan that may be used as a basis for programming one or more of the functional modules of FIG. 1 that relate to the functions that are illustrated in the diagram, using a programming development environment or programming language that is deemed suitable for the task. Thus, FIG. 6 and each other flow diagram herein are intended as an illustration at the functional level at which skilled persons, in the art to which this disclosure pertains, communicate with one another to describe and implement algorithms using programming. The flow diagrams are not intended to illustrate every instruction, method object or sub step that would be needed to program every aspect of a working program, but are provided at the high, functional level of illustration that is normally used at the high level of skill in this art to communicate the basis of developing working programs.

In one embodiment, a method 600 starts at step 602 where a fingerprint of a computing device, such as an industrial IoT device represented by node 110, 135, is calculated based on security service data of the device. For example, a security broker 105 obtains security service data, such as hardware data, software data, firmware data, memory usage data, or any other data from an industrial IoT device. The security broker 105 generates object identifiers for specific types of data and encrypts object identifiers by applying a hash function to calculate a fingerprint. The fingerprint is a collection of these encrypted object identifiers that uniquely identifies a particular node system. Subsequently, the security broker 105 may send the encrypted fingerprint out-of-band to a digital blockchain 190 data repository for storage.

In an embodiment, a security gateway 170 may detect in-band communication data to or from the industrial IoT device and send a request to an agent 180 requesting current security service data of the industrial IoT device. The agent 180 may be associated with the industrial IoT device, such as running on the node 110, 135 or running on the same network as the node 110, 135. In an embodiment, the request may be for a single encrypted object identifier or multiple encrypted object identifiers. In another embodiment, the agent 180 may send the one or more encrypted object identifiers without any request from the security gateway 170. For example, the agent 180 may encrypt and send the fingerprint information to the gateway 170 in regular intervals, that may be in milliseconds, seconds, minutes, hours, or any other incremental time period.

At step 604, the agent 180 encrypts the current security service data to generate encrypted current security service data representing the current fingerprint of the industrial IoT device. Specifically, the agent 180 encrypts a single current object identifier or multiple current object identifiers, depending on the request from the security gateway 170. In another embodiment, the security broker 105 may dynamically specify one or more encrypted current object identifiers for the security gateway 170 to request from the agent 180, or for the agent 180 to automatically send to the security gateway 170. For example, the security broker 105 may store security policies that specific which of the one or more object identifiers may be used by the security gateway 170 in conducting the real-time out-of-band health check. The agent 180 then sends the encrypted current security service data out-of-band to the security gateway 170.

At step 606, the security gateway 170 receives the encrypted current security service data out-of-band and conducts a real-time out-of-band health check of the industrial IoT device, based in part on the fingerprint that is stored in the blockchain 190. Specifically, the security gateway 170 conducts a health check by accessing the encrypted fingerprint that is stored in the blockchain 190 and comparing it to the encrypted current security service data that is received from the agent 180.

At step 608, the gateway determines whether to allow access to the in-band communication data. For example, if the data from the health check matches, then the security gateway 170 may determine that the integrity of the industrial IoT device has not been compromised by malware or bots. As a result, the security gateway 170 may allow access to the in-band communication data. However, if the data does not match, then the security gateway 170 may determine that the integrity of the industrial IoT device has been compromised. As a result, the security gateway 170 may deny access to the in-band communication data by blocking any ports associated with the potentially compromised node 110, 135. In an embodiment, the security gateway 170 may also send a challenge in response to detecting a mismatch that is only slightly off a range. For example, memory allocation for a certain process may be between one (1) megabyte (MB) and two (2) MB. If the agent 180 reports a memory allocation for a certain process is 2.3 MB, then the security gateway 170 may not block the port immediately.

Instead, the security gateway 170 may send a request for a different object identifier to minimize false positives.

In an embodiment, any authorized changes to the security service data of a node 110, 135 may be implemented through the security broker 105. The security broker 105 may encrypt the updated security service data to generate an updated fingerprint, which is saved to the blockchain 190 and used for subsequent health checks.

Using the foregoing techniques, programmed computers may use a distributed system to transfer, store, monitor, and utilize sensitive data in a manner that maximizes data security while improving device data integrity health checks. Implementations provide for decreased use of network bandwidth by using out-of-band communications and decreased use of processing resources for computing devices that no longer provide these health checks. Specifically, by using a distributed system of security brokers 105, agents 180, blockchains 190, and security gateways 170 to acquire, store, and compare security service data, the distributed system offers an improved method of detecting potential security breaches out-of-band while regulating in-band data communications to protect against any detected breaches.

Moreover, the foregoing techniques realize an improvement in computer functionality, specifically in relation to detecting and protecting against malware, botnets, and hardware manipulation. Previous approaches often depended upon prior knowledge of malware and botnet signatures and attack patterns. However, the current approach ensures that all authorized changes to nodes 110, 135 are conducted through a security broker 105 and any other changes are detected through continuous monitoring by the agent 180 and health checks by the security gateway 170. Any unauthorized changes may indicate a security breach and all in-band communications may be denied by closing specific ports. This provides an improvement over traditional security protection techniques that are based on previously-identified malware and botnets.

Furthermore, the approaches disclosed herein improve data security and data integrity by tamper proofing the data. The use of a blockchain 190 ensures that all changes to security service information are first approved by the consensus network, which protects the integrity of the blockchain data. The nature of the blockchain 190 also ensures that each new block of data is linked to the previous block, creating an improved method of documenting changes and rejecting unapproved changes. Consequently, the blockchain 190 functions as a secure backup for sensitive security service information with high Practical Byzantine Fault Tolerance (PBFT) and other types of consensus algorithms.

4.0 Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
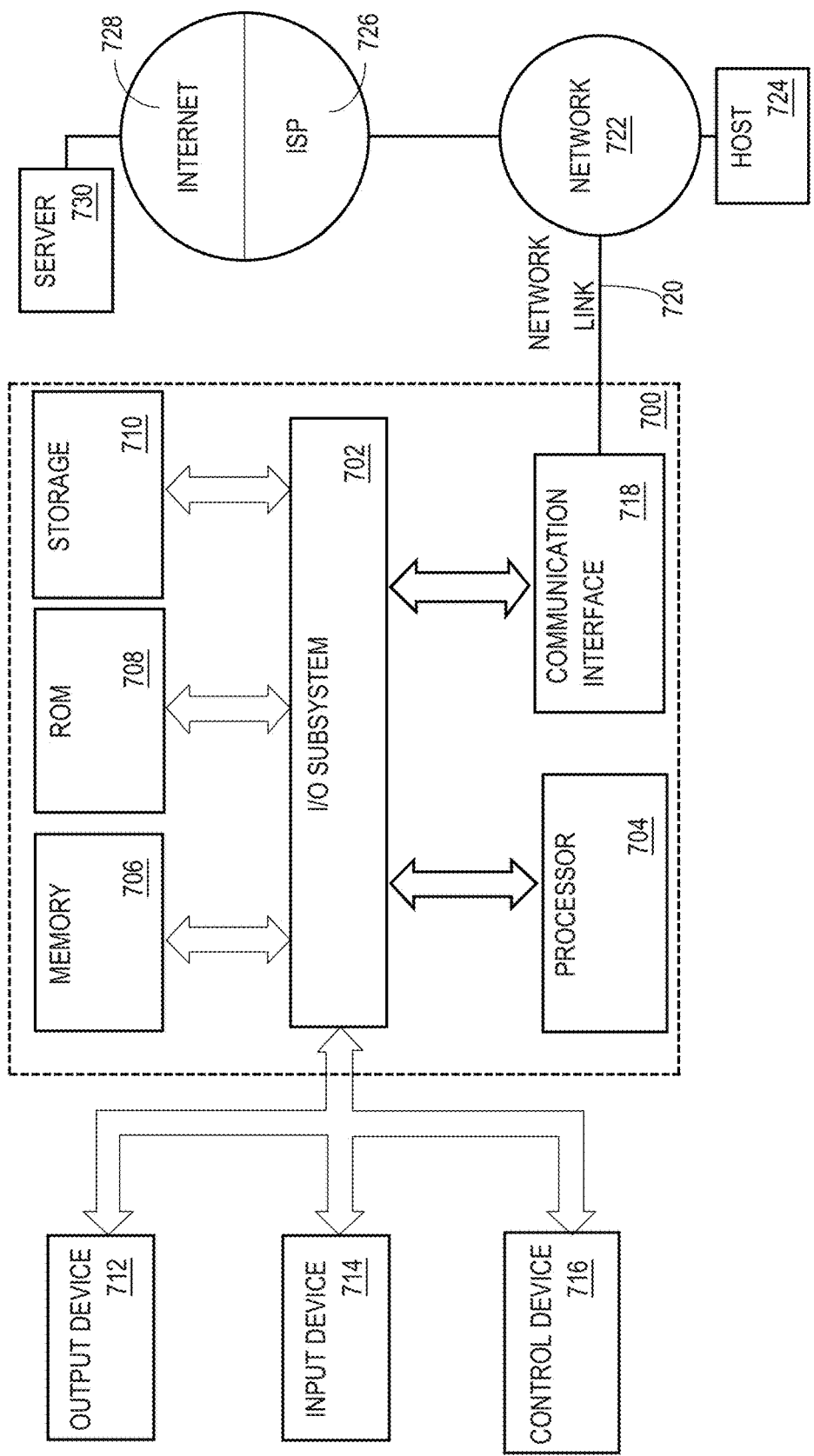
FIG. 7 illustrates a computer system upon which an embodiment of the invention may be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device.

An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method providing improvements in security breach detection, comprising:

calculating a digital fingerprint based on security service data of a computing device, and sending the fingerprint out-of-band for storing in a data repository;

generating encrypted current security service data from the computing device and sending the encrypted current security service data out-of-band to a gateway computing device;

using the gateway computing device, receiving the encrypted current security service data out-of-band and conducting a real-time out-of-band health check of the computing device based, at least in part, on the fingerprint that is stored in the data repository; and using the gateway computing device, in response to conducting the real-time out-of-band health check, determining whether to allow access to in-band communication data.

2. The computer-implemented method of claim 1, further comprising:

using the gateway computing device, detecting the in-band communication data to or from the computing device and requesting the current security service data of the computing device.

3. The computer-implement method of claim 1, wherein the fingerprint comprises encrypted security service data, and wherein conducting the real-time out-of-band health check of the computing device comprises comparing the encrypted current security service data to the fingerprint that is stored in the data repository.

4. The computer-implemented method of claim 1, further comprising:

generating a digital replica of the computing device, wherein the digital replica comprises the security service data; and wherein calculating the fingerprint of the computing device comprises using the digital replica.

5. The computer-implemented method of claim 1, further comprising:

receiving an authorized change to the security service data and generating an updated fingerprint based on the authorized change to the security service data;

sending the updated fingerprint out-of-band for storing in the data repository; and wherein conducting the real-time out-of-band health check of the computing device based, at least in part, on the fingerprint comprises using the updated fingerprint that is stored in the data repository.

6. The computer-implemented method of claim 1, wherein the security service data comprises: hardware data, firmware data, software data, and memory space data.

7. The computer-implemented method of claim 1, wherein the fingerprint comprises a plurality of encrypted data object identifiers, and wherein the plurality of encrypted data object identifiers is generated based on the security service data.

8. The computer-implemented method of claim 7, further comprising:

dynamically specifying one or more encrypted data object identifiers for the gateway computing device to use in conducting the real-time out-of-band health check.

9. The computer-implemented method of claim 1, wherein requesting current security service data of the computing device comprises requesting one or more data object identifiers, and wherein encrypting the current security service data comprises encrypting the one or more data object identifiers.

10. One or more non-transitory computer-readable storage media storing one or more instructions programmed for providing improvements in security breach detection and which, when executed by one or more intermediary computing devices, cause:

calculating a digital fingerprint based on security service data of a computing device, and sending the fingerprint out-of-band for storing in a data repository;

generating encrypted current security service data from the computing device and sending the encrypted current security service data out-of-band to a gateway computing device;

using the gateway computing device, receiving the encrypted current security service data out-of-band and conducting a real-time out-of-band health check of the computing device based, at least in part, on the fingerprint that is stored in the data repository; and using the gateway computing device, in response to conducting the real-time out-of-band health check, determining whether to allow access to in-band communication data.

11. The one or more non-transitory computer-readable storage media of claim 10, further comprising:

using the gateway computing device, detecting the in-band communication data to or from the computing device and requesting the current security service data of the computing device.

12. The one or more non-transitory computer-readable storage media of claim 10, wherein the fingerprint comprises encrypted security service data, and wherein conducting the real-time out-of-band health check of the computing device comprises comparing the encrypted current security service data to the fingerprint that is stored in the data repository.

13. The one or more non-transitory computer-readable storage media of claim 10, storing one or more further instructions which, when executed by the one or more intermediary computing devices, further cause:

generating a digital replica of the computing device, wherein the digital replica comprises the security service data; and wherein calculating the fingerprint of the computing device comprises using the digital replica.

14. The one or more non-transitory computer-readable storage media of claim 10, storing one or more further instructions which, when executed by the one or more intermediary computing devices, further cause:

receiving an authorized change to the security service data and generating an updated fingerprint based on the authorized change to the security service data;

sending the updated fingerprint out-of-band for storing in the data repository; and wherein conducting the real-time out-of-band health check of the computing device based, at least in part, on the fingerprint comprises using the updated fingerprint that is stored in the data repository.

15. The one or more non-transitory computer-readable storage media of claim 10, wherein the security service data comprises: hardware data, firmware data, software data, and memory space data.

16. The one or more non-transitory computer-readable storage media of claim 10, wherein the fingerprint comprises a plurality of encrypted data object identifiers, and wherein the plurality of encrypted data object identifiers is generated based on the security service data.

17. The one or more non-transitory computer-readable storage media of claim 16, storing one or more further instructions which, when executed by the one or more intermediary computing devices, further cause:
dynamically specifying one or more encrypted data object identifiers for the gateway computing device to use in conducting the real-time out-of-band health check.

18. The one or more non-transitory computer-readable storage media of claim 10, wherein requesting current security service data of the computing device comprises requesting one or more data object identifiers, and wherein encrypting the current security service data comprises encrypting the one or more data object identifiers.

19. A computer system providing improvements in security breach detection, the system comprising:
a distributed blockchain data repository;
a first computing device that is communicatively coupled to the distributed blockchain data repository and comprising a first non-transitory data storage medium storing a first set of instructions which, when executed by the first computing device, cause:
calculating a digital fingerprint based on security service data of an industrial computing device, and sending the fingerprint out-of-band for storing in a data repository;
a second computing device that is communicatively coupled to the computing device and comprising a second non-transitory data storage medium storing a second set of instructions which, when executed by the second computing device, cause:
generating encrypted current security service data from the industrial computing device and sending the encrypted current security service data out-of-band to a gateway computing device;
the gateway computing device that is communicatively coupled to the distributed blockchain data repository and comprising a third non-transitory data storage medium storing a third set of instructions which, when executed by the gateway computing device, cause:
receiving the encrypted current security service data out-of-band and conducting a real-time out-of-band health check of the industrial computing device based, at least in part, on the fingerprint that is stored in the data repository; and
in response to conducting the real-time out-of-band health check, determining whether to allow access to in-band communication data.

20. The computer system of claim 19, wherein the third non-transitory data storage medium stores an additional third set of instructions which, when executed by the gateway computing device, cause:
detecting the in-band communication data to or from the industrial computing device and requesting the current security service data of the industrial computing device from the second computing device that is associated with the industrial computing device.

21. The computer system of claim 20, wherein the fingerprint comprises encrypted security service data, and wherein conducting the real-time out-of-band health check of the industrial computing device comprises comparing the encrypted current security service data that is received from the second computing device to the fingerprint that is stored in the data repository.

22. The computer system of claim 21, wherein the first non-transitory data storage medium stores an additional first set of instructions which, when executed by the first computing device, cause:
generating a digital replica of the industrial computing device, wherein the digital replica comprises the security service data; and
wherein calculating the fingerprint of the industrial computing device comprises using the digital replica.

23. The computer system of claim 22, wherein the first non-transitory data storage medium stores an additional first set of instructions which, when executed by the first computing device, cause:
receiving an authorized change to the security service data and generating an updated fingerprint based on the authorized change to the security service data;
sending the updated fingerprint out-of-band for storing in the data repository; and
wherein conducting the real-time out-of-band health check of the industrial computing device based, at least in part, on the fingerprint comprises using the updated fingerprint that is stored in the data repository.

24. The computer system of claim 22, wherein the fingerprint comprises a plurality of encrypted data object identifiers, and wherein the plurality of encrypted data object identifiers is generated based on the security service data.

25. The computer system of claim 22, wherein requesting the current security service data of the industrial computing device from the second computing device comprises requesting one or more data object identifiers, and wherein encrypting the current security service data comprises encrypting the one or more data object identifiers.

* * * * *